United States Patent [19]
Tontini

[11] 3,737,005
[45] June 5, 1973

[54] THRUST AUGMENTING AND SOUND SUPPRESSING APPARATUS

[75] Inventor: Remo Tontini, San Diego, Calif.
[73] Assignee: Rohr Corporation, Chula Vista, Calif.
[22] Filed: Oct. 14, 1971
[21] Appl. No.: 189,309

[52] U.S. Cl. ...... 181/33 HC, 181/33 HD, 239/127.3, 239/265.13, 239/265.17
[51] Int. Cl. .......... B64d 33/06, F01n 1/14, F01n 1/16
[58] Field of Search ...................... 181/33 H, 33 HA, 181/33 HB, 33 HC, 33 G, 33 HD, 43, 33 HE, 51; 239/265.11, 265.13, 265.17, 127.3

[56] References Cited

UNITED STATES PATENTS

| | | | |
|---|---|---|---|
| 3,477,231 | 11/1969 | Paulson | 181/33 HA |
| 3,516,511 | 6/1970 | Urquhart | 181/33 HC |
| 3,533,486 | 10/1970 | Paulson | 181/33 HD |
| 3,579,993 | 5/1971 | Tanner et al. | 239/127.3 |
| 3,618,700 | 11/1971 | Bond et al. | 181/33 G |

FOREIGN PATENTS OR APPLICATIONS

| | | | |
|---|---|---|---|
| 935,119 | 8/1963 | Great Britain | 181/33 HA |

Primary Examiner—Robert S. Ward, Jr.
Attorney—George E. Pearson

[57] ABSTRACT

An aircraft jet engine is provided with an ejector nozzle which suppresses jet noise and augments thrust during takeoff and climb. The nozzle is formed as an ejector barrel supported aft of the exhaust nozzle and defines, with the nozzle, inlet passage means for free stream air to enter and mix with engine gases in the mixing zone defined by the barrel. The inner wall of the barrel is formed primarily of acoustical and structural honeycomb paneling perforated on the mixing zone side which suppresses noise and makes the inner wall virtually self supporting. A plenum chamber in the barrel supplies energized gas to an auxiliary jet nozzle in the form of a peripheral slot through the inner wall and receives the gas from the engine through conduits connected to a secondary exhaust nozzle. The latter includes a lobed section in which the side walls of the lobes are formed of acoustical and structural honeycomb to further suppress noise and make the lobe side walls self supporting.

12 Claims, 4 Drawing Figures

Patented June 5, 1973

INVENTOR.
REMO TONTINI

BY

George E. Pearson
ATTORNEY

THRUST AUGMENTING AND SOUND SUPPRESSING APPARATUS

BACKGROUND OF THE INVENTION

This invention lies in the field of gas turbine or jet engines which produce reaction thrust by the high velocity rearward discharge of exhaust gases from the engines. In order to obtain the maximum thrust from a simple engine a great deal of study and calculation goes into the design of the exhaust nozzle, and for best results it must be tailored to the particular installation, taking into account the weight, speed, and other operating characteristics of the airplane on which it is mounted.

One way of increasing the thrust of such an engine is to design it so that the compressor delivers more air than the turbine uses, the excess flowing around the outside of the turbine and joining the turbine exhaust. The mixing of the two gases adds mass to the thrust producing stream and reduces the velocity and temperature thereof, which also reduces the noise level.

Another system which is used extensively includes the provision of an ejector barrel which is larger than the exhaust nozzle outlet and is located aft of the nozzle. Free stream air enters the flow path between the exhaust nozzle and the barrel and mixes with the exhaust gas, and also with the fan air if the engine is of the fan type. All of the gases mix within the barrel with the same general effects mentioned above.

When an ejector barrel is used with a lobed or "daisy" nozzle, further noise suppression is achieved because free stream air meets turbine gas along a much greater marginal path than with a simple nozzle to greatly increase the mixing effect. The pressures and vibration forces within lobed nozzles and ejector barrels are very great and normally they are provided with many heavy and complicated bracing members to help them to withstand these forces and prevent failure. Also, the jet stream noise level is still undesirably high even with the suppression effects of the lobed nozzle and the ejector barrel.

SUMMARY OF THE INVENTION

The present invention is directed particularly to the type of aircraft jet engine which incorporates an ejector barrel with or without a lobed nozzle and with or without the addition of the fan air feature. In one form it improves the ejector action and makes it possible to use a shorter and lighter ejector barrel. In any form it increases noise suppression and provides great strength and rigidity of the components while substantially reducing bracing members which add weight and often impede free flow of the gases.

Generally stated, and in presently preferred forms, the total apparatus includes a jet engine having a rearwardly discharging exhaust nozzle which may be divided into a primary nozzle and a secondary nozzle attached thereto and having a conventional lobed form in its aft portion. An ejector barrel is located aft of the nozzle and preferably with its entrance end in the vicinity of the exit margin of the exhaust nozzle. Preferably the forward end of the barrel is attached to the outer ends of the lobes at or near the nozzle exit margin, and the valleys between the lobes provide paths for inflow of free stream air to mix with the engine gas in the mixing zone defined by the barrel.

The gas pressure and vibration forces within the barrel are very high and normally the barrel is heavily braced to withstand them. In the present construction substantially the entire inner wall of the barrel is formed of metallic acoustical and structural honeycomb paneling which is so strong and rigid that the need for bracing members is almost completely eliminated. In addition, the inner surface of the inner wall is provided with a multiplicity of apertures therethrough communicating with the honeycomb core cells to provide resonating cavities which act to suppress the sound energy of the gases flowing through the barrel.

The same forces are present within each of the lobes of the exhaust nozzle and tend to force the generally planar walls of the lobe apart. Tie rods extending across the lobe interiors between the walls resist these forces but at the same time they interfere with the free flow of the gases. In order to overcome this difficulty in the present invention, the side walls of each lobe are formed of metallic acoustical and structural honeycomb which provides so much strength and rigidity that no tie rods are needed. In addition the inner faces of the walls are perforated as in the case of the ejector barrel to increase the noise suppression. The forward or first section of the secondary nozzle is generally cylindrical and is also formed of metallic acoustical and structural honeycomb to still further increase the noise suppression. This first section so constructed is so strong and rigid that it serves as a cantilever member to support the second section and the ejector barrel and to attach them to the primary exhaust nozzle.

The thrust and efficiency of the assembly may be further increased by dividing the inner wall of the ejector barrel into forward and aft sections separated by a peripheral slot which serves as an auxiliary jet nozzle to discharge energized gas in a ring around the periphery of the mixed gases flowing through the ejector barrel and add energy thereto. A plenum chamber in the ejector barrel receives energized gas from the engine through conduits connected to the exhaust nozzle and the plenum chamber, and communicates with the jet nozzle through which the gas is discharged. Portions of the ejector barrel aft of the jet nozzle may be made separate and pivoted on transverse axes to serve as blocker doors swinging rearwardly and inwardly toward each other to block the jet stream and produce reverse thrust.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
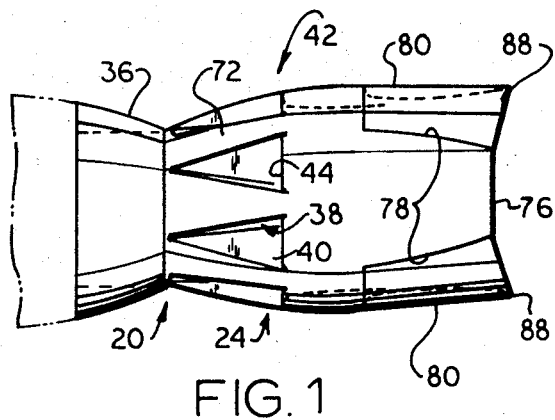
FIG. 1 is a schematic view in side elevation of an apparatus incorporating the invention.
Figure 2:
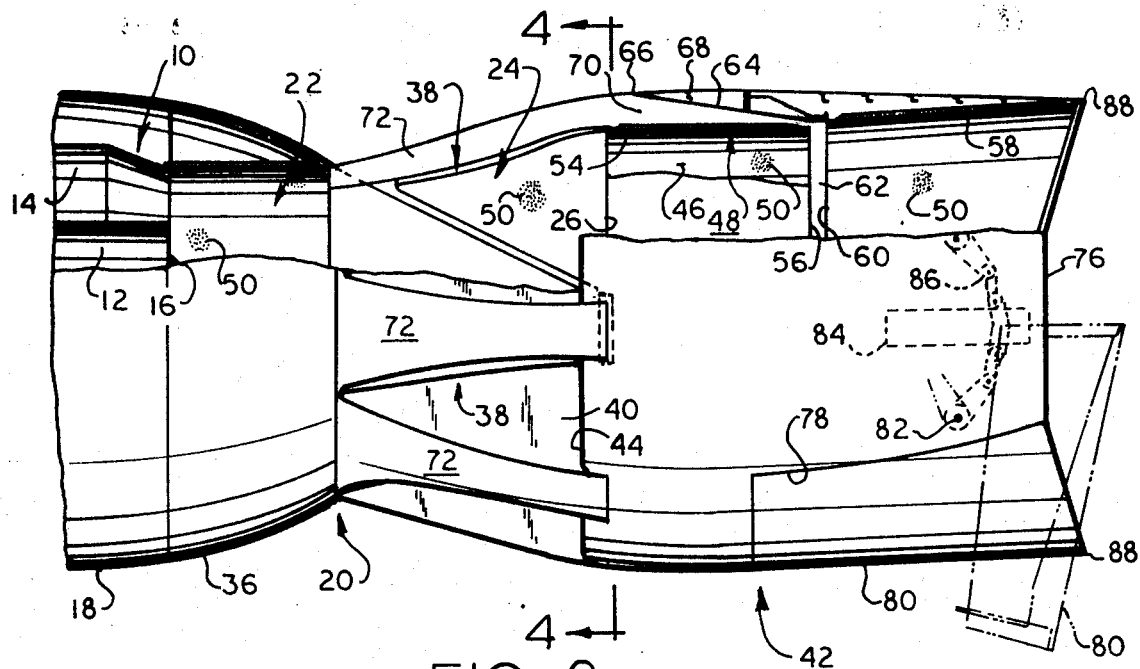
FIG. 2 is an enlarged view similar to FIG. 1 broken away in part to show details of construction.

An installation incorporating the invention is shown schematically in FIGS. 1 and 2, in which a jet engine, not shown, is provided with a rearwardly discharging primary exhaust nozzle 10 having a first central duct 12 discharging turbine gas and a second peripheral duct 14 surrounding the first duct and discharging fan air, with both ducts terminating at exit plane 16. A nacelle 18 surrounds the engine and primary exhaust nozzle.

Figure 3:
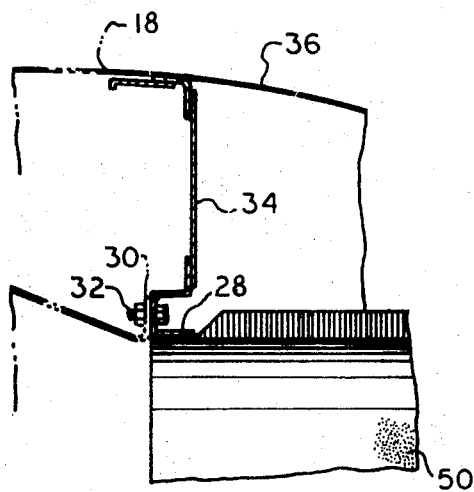
FIG. 3 is a sectional view showing the manner of attachment of the apparatus to an engine.

A secondary exhaust nozzle 20 includes a first generally cylindrical section 22 and a second section 24 in the form of a lobed or "daisy" nozzle having an exit plant 26, the two sections being permanently secured together. As shown in FIG. 3, the first section is provided with an annular flange 28 which is secured to the standard engine flange 30 by a series of bolts 32. Web 34, secured to flange 28, carries a fairing 36 to complete the contour of the nacelle. The lobes 38 are peripherally spaced and extend radially and axially to divide the gas flow into separate streams, and between them they define valleys which provide flow paths 40 for free stream air to enter and mix with the engine gases.

An ejector barrel 42 is connected at its entrance end 44 to the radially outer ends of the lobes and is located aft of the nozzle with its entrance end 44 in the vicinity of exit plane 26. The interior of the barrel defines a mixing zone 46 where the free stream air meets with the engine gases to mix with them and add mass to the flow, increasing the thrust and reducing the noise level in known manner. The inner wall 48 of the barrel is formed primarily of metallic acoustical and structural honeycomb paneling which is so rigid and strong that the wall is able to resist the gas pressure and vibration forces with little or no support in the form of bracing members. The inner surface of wall 48 is provided throughout its area with a multiplicity of apertures 50 therethrough communicating with the honeycomb core cells to provide resonating cavities which suppress the noise of the propulsion flow.

Figure 4:
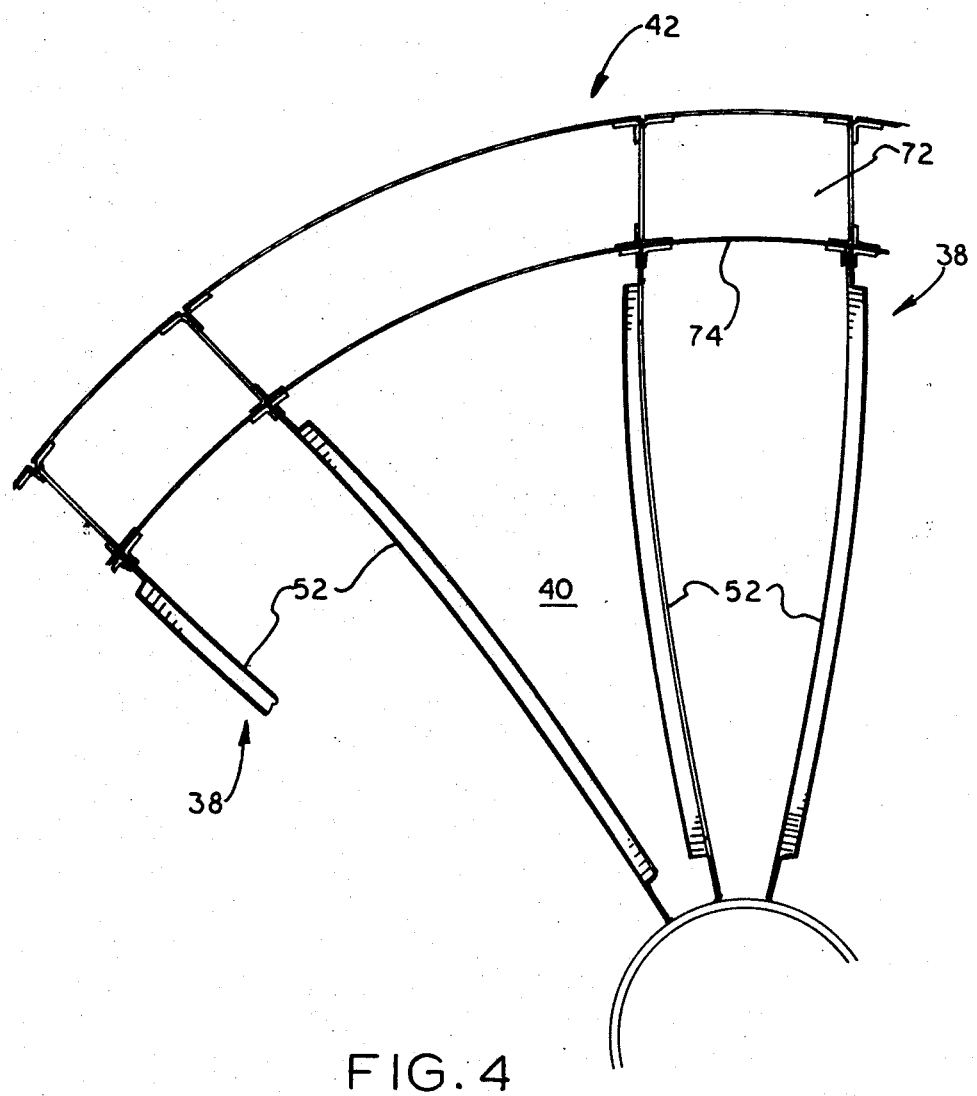
FIG. 4 is a sectional view taken on line 4—4 of FIG. 2.

The lobed nozzle section 24 is subject to the same high destructive forces as the inner wall of the ejector barrel. The form and construction of the lobes are shown in FIG. 4. The gas pressure within each lobe 38 tends to force its walls 52 apart, and this loading combined with the vibration forces tends to cause failure. Instead of using a plurality of tie bolts which interfere with gas flow, each side wall 52 is formed of the same type of paneling as wall 48. Thus the panels are rigid enough to retain their shape and strong enough to resist the forces imposed on them. The inner surfaces of walls 52 are perforated throughout their area and thus increase the total amount of sound suppression.

The first section 22 is also subjected to the destructive forces of gas pressure and vibration and is likewise formed of metallic acoustical and structural honeycomb paneling. This paneling further suppresses jet stream noise and is so strong and rigid that section 22 serves as a cantilever member to support section 24 and ejector barrel 42. The entire assembly is made unitary and may be readily applied as a retrofit to any existing engine by removing the section aft of the primary nozzle and bolting the new assembly to the standard engine flange.

The effectiveness of the apparatus may be further improved by the addition of means for producing a ring or shield of energized gas around the gaseous mixture in the ejector barrel to add energy to the total flow and flatten the velocity profile which increases thrust and reduces noise. As seen in FIG. 2, the inner wall 48 of the ejector barrel is divided into a forward section 54 having a trailing edge 56 and an aft section 58 having a leading edge 60 spaced from trailing edge 56 to define a peripheral slot 62 through the wall serving as an auxiliary jet nozzle. A partition 64 extends around the periphery of the interior of the ejector barrel and from a forward point 66 of the outer wall 68 to the leading edge 60 of the inner wall. It is smooth and imperforate and cooperates with the smooth and imperforate outer surface of the inner wall 48 to define a plenum chamber 70 which is devoid of any obstructions which would impede the flow of gas through the plenum chamber.

Conduits 72 are connected at their aft ends to the plenum chamber and at their forward ends to nozzle section 22 at its periphery. They are in longitudinal alignment with fan air duct 14 and thus receive primarily fan air which passes through the conduits to the plenum chamber and thence out through jet nozzle 62. It will be noted that rearwardly converging partition 64 cooperates with the inner wall section 54 to impart a somewhat rearwardly converging path to the exiting gas stream. The leading edge 60 of section 58 is peripherally larger than the trailing edge 56 of section 54 to cause the jet nozzle exit to face primarily rearward and cooperate with the converging path of the gas stream. The flow from the jet nozzle produces a virtual nozzle profile for the aft section of the ejector barrel which depends on the energy of the flow. This virtual nozzle profile is selected for optimum performance and is achieved by tailoring the jet nozzle shape and gas flow amount for each particular installation.

As previously stated, conduits 72 overlie the outer ends of the lobes 38 to leave valleys 40 clear for the inflow of free stream air. As seen in FIG. 4, the inner wall 74 of each conduit also serves as the outer end wall of each lobe, and they share this common wall throughout the major part of their lengths. All of these components are welded into unity so that the conduits and lobes serve to mutually reinforce each other.

Because of the strong and rigid construction of the ejector barrel and the fact that the jet nozzle is well forward of the exit end 76 of the barrel, it is very simple to install thrust reversing means. As can be seen in FIGS. 1 and 2, portions of the ejector barrel may be cut away to form openings 78 in which blocker doors 80 are located. The doors are pivoted on transverse axes 82 and operated by a conventional servo motor 84 and linkage 86 to swing from stowed position shown in solid lines rearward and inward toward each other until their trailing edges 88 contact each other at the axis of the ejector barrel to block rearward flow of the jet stream and redirect it laterally and forwardly to produce reverse thrust. While the doors may be of any construction, their inner walls preferably are made of the same honeycomb paneling as the wall 58 because the forces on them during thrust reversal are very high. Their outer walls may be single thickness skin with simple stringers for bracing.

Having thus described the invention, what is now claimed as new and useful and is desired to be protected by U.S. Letters Patent is:

1. Apparatus for augmenting the thrust and suppressing the exhaust noise of a jet engine having a rearwardly discharging exhaust nozzle, comprising: an ejector barrel having an entrance end and an exit end; the ejector barrel being located in operative position aft of the exhaust nozzle with its entrance end adjacent to the nozzle exit and spaced at least in part from the nozzle to define inlet path means for the flow of free stream air; the barrel defining a mixing zone for the free stream air and the gas stream issuing from the nozzle; the inner wall of the barrel being divided into a forward section and an aft section; the leading edge of the aft section being spaced from the trailing edge of the forward section to define between them a rearwardly discharging auxiliary jet nozzle in the form of a peripheral slot through the inner wall; and means to supply gas under pressure to the jet nozzle to peripherally surround the gaseous stream and add energy thereto; the inner walls of the forward and aft sections being formed primarily of metallic acoustical and structural honeycomb paneling serving to make the walls self supporting and sound suppressing; the inner surfaces of the walls exposed to the mixing zone being provided with a multiplicity of apertures communicating with the honeycomb core cells to provide resonating cavities to suppress the sound energy of the gaseous stream.

2. Apparatus as claimed in claim 1; and a smooth imperforate partition extending around the interior of the barrel and from its outer wall to the leading edge of the inner wall of the aft section; the outer surface of the forward inner wall being smooth and imperforate; the partition and the inner wall defining between them an annular plenum chamber for the jet nozzle which is devoid of flow obstructions; and conduit means extending between the engine exhaust nozzle and the plenum chamber to conduct energized gas from the engine to the plenum chamber.

3. Apparatus as claimed in claim 2; the partition converging rearwardly from the forward end of the plenum chamber to cooperate with the forward inner wall in directing the energized gas convergently rearward through the jet nozzle.

4. Apparatus as claimed in claim 3; the leading edge of the aft inner wall being peripherally larger than the trailing edge of the forward inner wall to cause the jet nozzle exit to face primarily rearward.

5. Apparatus as claimed in claim 1; portions of the inner and outer walls of the aft section of the ejector barrel being separate from the main body thereof and being pivotally mounted on transverse axes to swing rearwardly and inwardly toward each other to serve as thrust reversing blocker doors.

6. Apparatus as claimed in claim 5; the inner walls of the blocker door portions in stowed position defining portions of the honeycomb panel inner wall construction of the aft section of the ejector barrel.

7. Apparatus for augmenting the thrust and suppressing the exhaust noise of a jet engine having a rearwardly discharging primary exhaust nozzle having attachment means in the general plane of the nozzle exit, comprising: a secondary exhaust nozzle having a first generally cylindrical section provided at its leading edge with attachment means for connection to the attachment means of the primary exhaust nozzle, and a second section in direct continuation of the first section and having the form of a lobed nozzle with a plurality of peripherally spaced radially and axially extending lobes defining between them valleys for the inflow of free stream air; an ejector barrel having an entrance end and an exit end; the ejector barrel being located in operative position aft of the lobed nozzle with its entrance end adjacent to the nozzle exit and being secured to the radially outer ends of the lobes to support it in position; the barrel defining a mixing zone for the free stream air and the gas stream issuing from the nozzle; the inner wall of the barrel being formed primarily of metallic acoustical and structural honeycomb paneling serving to make the wall self supporting and sound suppressing; the inner surface of the wall exposed to the mixing zone being provided with a multiplicity of apertures communicating with the honeycomb core cells to provide resonating cavities to suppress the sound energy of the gaseous stream; the side walls of each lobe of the secondary exhaust nozzle being formed of metallic acoustical and structural honeycomb paneling serving to make them self supporting and sound suppressing; the inner surface of each side wall exposed to the exhaust gases being provided with a multiplicity of apertures communicating with the honeycomb core cells to provide resonating cavities.

8. Apparatus as claimed in claim 7; the first section of the secondary exhaust nozzle also being formed of metallic acoustical and structural honeycomb paneling with its inner surface provided with a multiplicity of apertures communicating with the honeycomb core cells to provide resonating cavities; the first section serving as a cantilever member to support the second section and the ejector barrel.

9. Apparatus as claimed in claim 7; the inner wall of the ejector barrel being divided in a lateral plane intermediate the ends of the barrel to provide a peripheral slot serving as an auxiliary jet nozzle; the forward portion of the barrel being hollow to serve as a plenum chamber communicating with the jet nozzle; and a plurality of longitudinally extending conduits connected at their aft ends to the plenum chamber and at their forward ends to the first section of the secondary nozzle at its periphery to conduct energized gas from the engine to the plenum chamber; each of the conduits overlying the outer end of one of the lobes to leave the valleys between the lobes clear for the inflow of free stream air.

10. Apparatus as claimed in claim 9; each conduit being united throughout the major portion of its length with the outer end of its associated lobe for mutual reinforcement.

11. Apparatus as claimed in claim 9; the primary exhaust nozzle being divided into a first central duct discharging turbine gas and a second peripheral duct surrounding the first duct and discharging fan air; the forward ends of the conduit at the periphery of the first section of the secondary nozzle being in longitudinal alignment with the second duct to receive primarily fan air for transfer to the plenum chamber.

12. Apparatus for augmenting the thrust and suppressing the exhaust noise of a jet engine having a rearwardly discharging exhaust nozzle, comprising: an ejector barrel having an entrance end and an exit end; the ejector barrel being located in operative position aft of the exhaust nozzle with its entrance end adjacent to the nozzle exit and spaced at least in part from the nozzle to define inlet path means for the flow of free stream air; the barrel defining a mixing zone for the free stream air and the gas stream issuing from the nozzle; the inner wall of the barrel being formed primarily of metallic acoustical and structural honeycomb paneling serving to make the wall self supporting and sound suppressing; the inner surface of the wall exposed to the mixing zone being provided with a multiplicity of apertures communicating with the honeycomb core cells to provide resonating cavities to suppress the sound energy of the gaseous stream.

* * * * *